United States Patent
Brent et al.

(10) Patent No.: US 6,299,826 B1
(45) Date of Patent: Oct. 9, 2001

(54) FLOW FIELD IN THE INLET PLENUM OF A FLUIDIZED BED

(75) Inventors: Allon Dudley Brent, Duncraig (AU); Ross Jeffrey Haywood, Waterloo (CA); William David Warnica, Mississauga (CA); Grant Caffery, Vancouver (CA)

(73) Assignee: BHP Direct Reduced Iron Pty Ltd., Perth (AU)

( * ) Notice: Subject to any disclaimer, the term of this patent is extended or adjusted under 35 U.S.C. 154(b) by 0 days.

(21) Appl. No.: 09/445,253

(22) PCT Filed: Jun. 3, 1998

(86) PCT No.: PCT/AU98/00411

§ 371 Date: Feb. 7, 2000

§ 102(e) Date: Feb. 7, 2000

(87) PCT Pub. No.: WO98/55218

PCT Pub. Date: Dec. 10, 1998

(30) Foreign Application Priority Data

Jun. 3, 1997 (AU) .................................................. PO 7154

(51) Int. Cl.[7] .............................. C22B 5/14; F27B 15/00
(52) U.S. Cl. ............................................ 266/172; 432/58
(58) Field of Search ............................... 266/172; 432/15, 432/58

(56) References Cited

U.S. PATENT DOCUMENTS

| | | |
|---|---|---|
| 3,915,657 | 10/1975 | Staffin et al. . |
| 4,257,171 * | 3/1981 | Johnson et al. ................... 432/58 |
| 5,538,544 | 7/1996 | Nowobilski et al. . |
| 5,904,119 * | 5/1999 | Gomez ............................. 432/58 |

FOREIGN PATENT DOCUMENTS

| | | |
|---|---|---|
| 490892 | 12/1976 | (AU) . |
| 775393 | 5/1957 | (GB) . |
| 1069729 | 5/1967 | (GB) . |

* cited by examiner

*Primary Examiner*—Scott Kastler
(74) *Attorney, Agent, or Firm*—Baker Botts L.L.P.

(57) ABSTRACT

A gas plenum assembly for a fluidised bed apparatus, including a structure defining one or more side and base walls about a plenum chamber and means defining an inlet for gas to the chamber, arranged so that the gas flows generally upwardly into the chamber from the inlet. The assembly includes distributor means overlying the chamber, having multiple openings through which the gas exits the chamber for forming a fluidised bed above the distributor means. Means are disposed between the inlet and the distributor means for spreading the gas flow among the openings. The gas flow spreader means has a plurality of apertures for the gas flow therethrough, and the gas flow spreader means and the flow apertures are sized and arranged to substantially reduce cross-flow velocity of the gas at the openings.

19 Claims, 9 Drawing Sheets

DETAIL A

FLOW FIELD IN THE INLET PLENUM OF A FLUIDIZED BED

FIELD OF THE INVENTION

This invention relates generally to fluidised bed apparatus and is concerned in particular with an improved gas inlet plenum assembly for such apparatus. The invention has been found to be particularly useful in the fluidised bed reactors employed for direct reduction of iron ore (DRI) but has general application in the improvement of gas flow distribution in the plenum chamber of fluidised bed reactors and furnaces.

BACKGROUND ART

In a known process for the direct reduction of iron ore, hereinafter referred to as the subject fluidised bed DRI process, iron ore fines are passed downwardly in succession through a series of fluidised bed reactors against an upward counterflow of reducing gas. The process is practised commercially in Venezuela and is known there as the FIOR process. In that plant, the product of the lowermost reactor (the first reactor for the gas flow) is passed to a briquetting facility to produce a stable metallised iron product which is, inter alia, a suitable feed for electric arc steel furnaces, so-called mini-mills. The reducing gas delivered to the lowermost reactor is typically a mix of a reformed natural gas with compressed scrubbed top gas recycled from the uppermost reducing reactor. In each reactor, this gas serves as the fluidising medium as well as the reductant and is therefore delivered to the bottom of each reactor housing via a plenum chamber, for admission to the main reaction chamber through multiple nozzles of a distributor plate which supports the fluidised bed. Within each reactor, internal cyclones extract fine ore dust from the top gas before it is delivered to the next upper reactor or, in the case of the uppermost reactor, recycled to the reducing gas feed stream. The dust extracted in the cyclones is returned to the fluidised bed via respective diplegs.

Particular forms or modifications of this process are described, for example, in U.S. Pat. Nos. 5,082,251, 5,370,727 and 5,439,504, international patent publication WO 96/10094 and Australian patent application no. 15007/95.

In the current commercial practice of the FIOR DRI process, the gradual build up of accretions at various points in the reactor configuration steadily diminishes the performance of the process and eventually reduces gas flows to a point where the process must be stopped and the accretions removed. Experience has shown that accreted material in nozzles and in the reactor lower plenum chamber tends to be deposited in regions of stagnation in the fluid flow. Accretions occur in stagnant regions resulting from direct gas impingement as well as in regions of flow separation.

The problem was addressed in Australian patent 490892, which proposed a modified shape of nozzle for the distributor plate. Although not directly suggested as relevant to the reduction of the rate of accretion formation, this reference also illustrates a dual baffle plate arrangement in the plenum chamber under the distributor plate rather than the single baffle plate used in the FIOR reactors. The upper baffle plate is an annulus or donut, and the other is a smaller disc.

More complex distributor plate configurations are described in British patent 1119250, Swiss patent 583066, and European patent publication 421506. The first two of these disclose a double-plate arrangement with offset apertures. EP 421506 depicts two spaced perforated plates or screens sandwiching a bed of balls.

It is an object of the present invention, in a preferred application, to reduce the rate at which accretions form in the subject fluidised bed DRI process at and adjacent the distributor plate nozzles of the inlet plenum assemblies.

DISCLOSURE OF THE INVENTION

In accordance with the invention, it has been realised that the rate of accretion formation can be reduced materially by modifying the gas flow distribution in the plenum chamber, and that one way of achieving this in an advantageous manner is by means of a selected perforated baffle arrangement within the plenum chamber, in place of the impervious baffle plate traditionally employed in the FIOR DRI process to substantially reduce cross-flow at the nozzle inlet openings.

The invention accordingly provides, in one aspect, in a gas plenum assembly for a fluidised bed apparatus, including:

structure defining one or more side and base walls about a plenum chamber;

means defining an inlet for gas to the chamber, arranged so that the gas flows generally upwardly into said chamber from the inlet;

distributor means overlying said chamber and having multiple openings through which the gas exits the chamber for forming a fluidised bed above the distributor means; and means disposed between said inlet and said distributor means for spreading the gas flow among the openings;

the improvement wherein the gas flow spreader means has a plurality of apertures for said gas flow therethrough, and wherein said gas flow spreader means and said flow apertures are sized and arranged to substantially reduce cross-flow velocity of said gas at said openings.

Preferably, the gas spreader means includes one or more perforated baffle plates.

In another aspect, the invention provides, in a fluidised bed reactor for reducing particulate iron oxide, including:

a gas inlet plenum assembly having structure defining one or more side and base walls about a plenum chamber:

means defining an inlet for gas to the chamber, arranged so that the gas flows generally upwardly into said chamber from the inlet;

distributor means overlying said chamber and having multiple openings defined by upwardly convergent nozzles through which said gas exits the chamber for forming a fluidised bed above the distributor means; and means disposed between said inlet and said distributor means for spreading the gas flow among said openings;

the improvement comprising means in said gas inlet plenum assembly arranged to substantially reduce gas cross-flow velocity at said nozzles and thereby to minimise the rate of formation of accretions on or adjacent to the nozzles which diminish flow from the plenum chamber.

Preferably, the gas inlet plenum assembly is substantially axially symmetrical about a central vertical axis. The distributor means preferably includes a distributor plate and the openings therein may include nozzles which, at least for application to the reduction of iron oxides, are upwardly convergent cones.

The baffle plate means advantageously includes between one and three baffle plates extending generally parallel to the distributor plate and generally midway between the distributor plate and the gas inlet.

Preferably, where there is more than one baffle plate, the spacing between the plates is no greater than about ten times the average centre-to-centre spacing of the apertures in the baffle plate. These apertures are preferably circular and may be arranged in any convenient array eg a square or triangular array.

BRIEF DESCRIPTION OF THE DRAWINGS

The invention will now be further described, by way of example only, with reference to the application of the invention to the aforementioned FIOR process and by reference to the accompanying drawings, in which.

DESCRIPTION OF PREFERRED EMBODIMENTS

Figure 1:
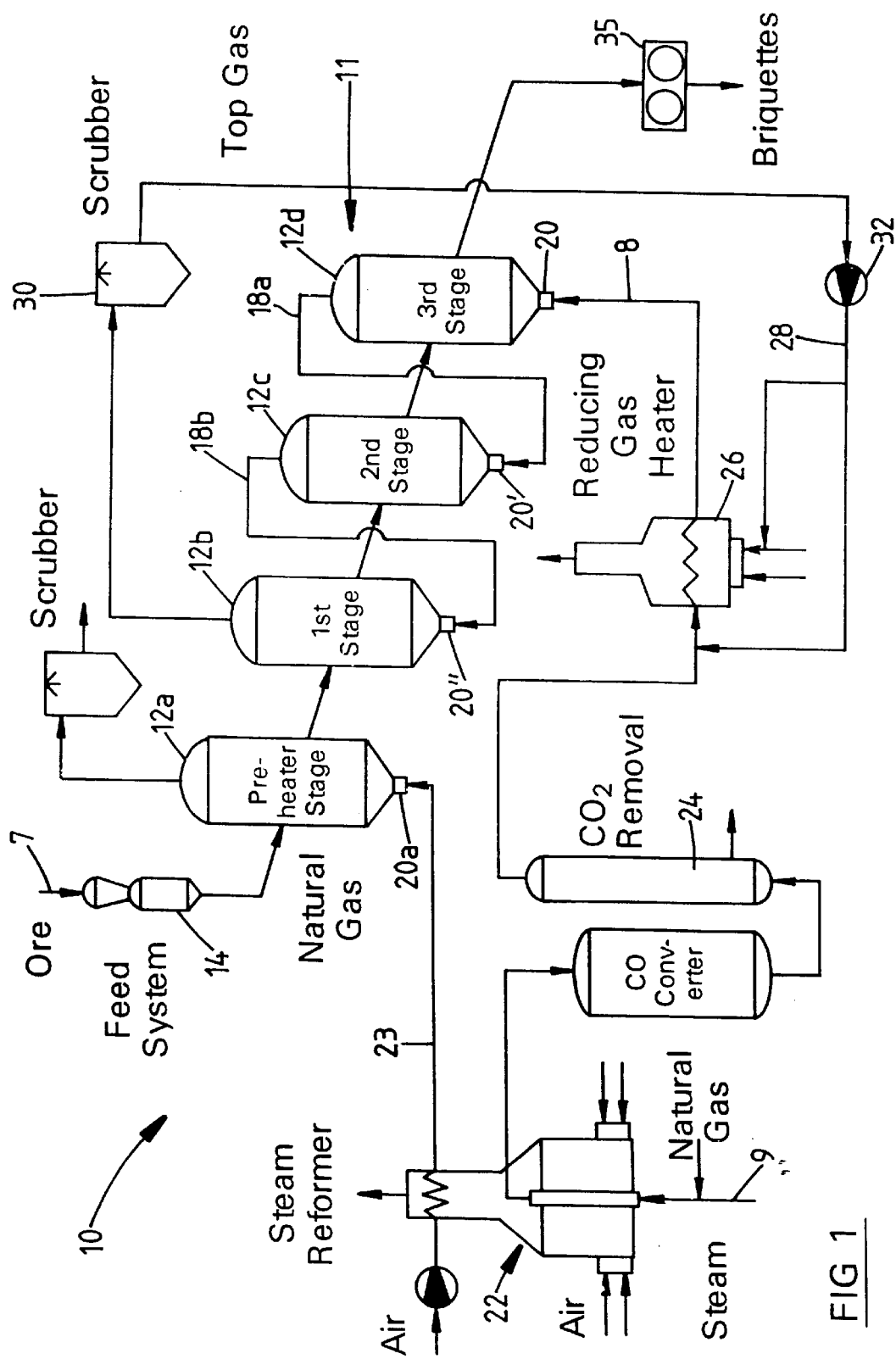
FIG. 1 is a schematic diagram of the FIOR fluidised bed DRI process.

FIG. 1 is a schematic diagram of a FIOR process plant for operating the subject fluidised bed DRI process for reducing iron ore fines and outputting a briquetted metallised product. The core component of the plant is an inclined cascade 11 of four fluidised bed reactors 12a–12d. Iron ore fines 7 delivered to the uppermost reactor via a feed system 14 pass successively down through the reactors against a counterflow of reducing gas 8 in reactors 12b–12d which metallises the iron ore and also serves as the fluidising gas for the fluidised beds. The first reactor 12a, is a preheater while the other three are reducing reactors. The reducing gas is delivered to the lowermost reactor 12d via a gas inlet plenum assembly 20, recovered as a top gas and passed in turn via transfer ducts 18a, 18b to reactors 12c and 12b via plenum assemblies 20' and 20" similar to plenum assembly 20. Within each of the three reducing reactors, there are multiple cyclones (not shown) for cleaning the top gas of material, which is returned to the respective fluidised beds via diplegs.

The reducing gas is primarily derived by reforming natural gas 9 in a steam reformer 22, and removing carbon dioxide in a $CO_2$ scrubber 24. The reducing gas is also pre-heated in a heater 26 and augmented by recycled top gas 28 from uppermost reducing reactor 12b after scrubbing (30) and compression (32).

In the uppermost pre-heater reactor 12a, natural gas exhausted from the steam reformer 22 via duct 23 to plenum assembly 20a serves both as the fluidising gas and as fuel. In an alternative arrangement, described for example in U.S. Pat. Nos. 5485032 and 5370727, the top gas from reducing reactor 12b is used as the fluidising heating gas in the pre-heater reactor 12a, and the recycled top gas 28 is extracted from reactor 12a.

The metallised iron product of the lowermost reactor 12d is directed to a briquetting plant 35: the output is known as hot briquetted iron (HBI). The space comprising the ore feed system 14, reactors 12a to 12d, and the briquetting plant is maintained sealed and under superatmospheric pressure to minimise re-oxidation of the iron.

Figure 2:
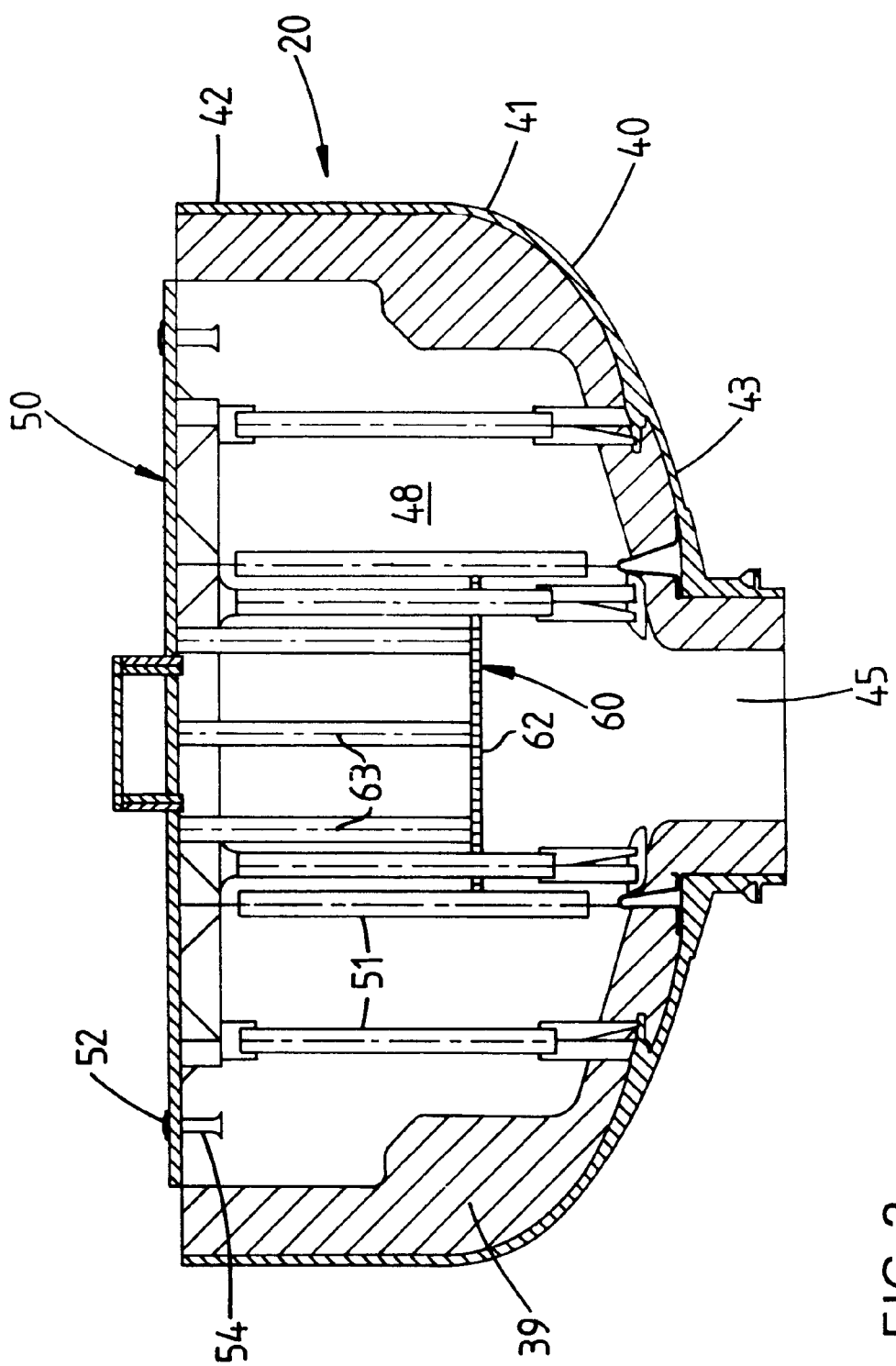
FIG. 2 is a diagrammatic cross-sectional view of a first embodiment of gas inlet plenum assembly for any of the four fluidised bed reactors indicated in FIG. 1.

FIG. 2 is a cross sectional diagram of each of the gas inlet plenum assemblies 20, 20', 20". A main bowl-shaped housing 40 is formed by a steel outer casing 41 lined with refractory bricks 39. Housing 40 has an upper, substantially cylindrical side wall portion 42 and a base wall portion 43 about a plenum chamber 48. In this embodiment, base wall portion 43 is defined by revolution of a quadrant about a gas inlet opening 45 at the centre bottom of base wall portion 43, but other configurations are of course possible. In operation, reducing gas is delivered to inlet 45 via an elbow (not shown) 46 which directs the gas to flow generally centrally upwardly into plenum chamber 48.

Figure 4:
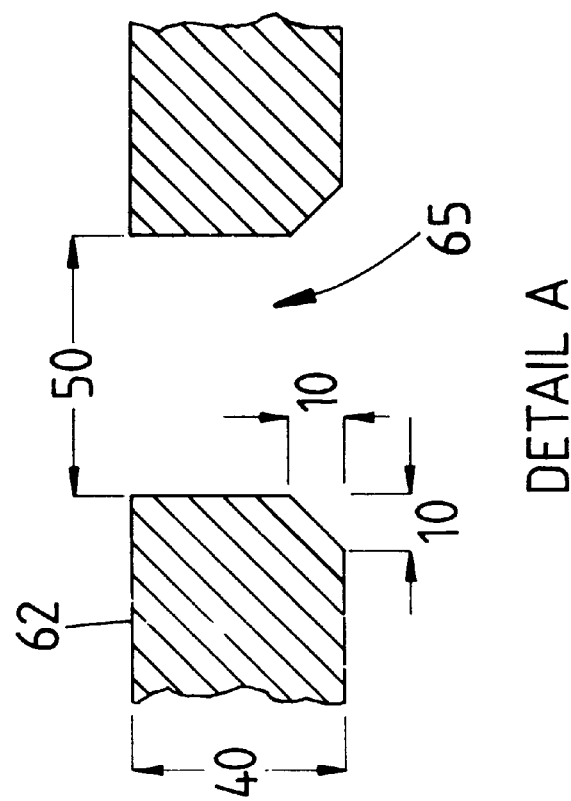
FIG. 4 is enlargement detail of region A in FIG. 3.
Figure 5:
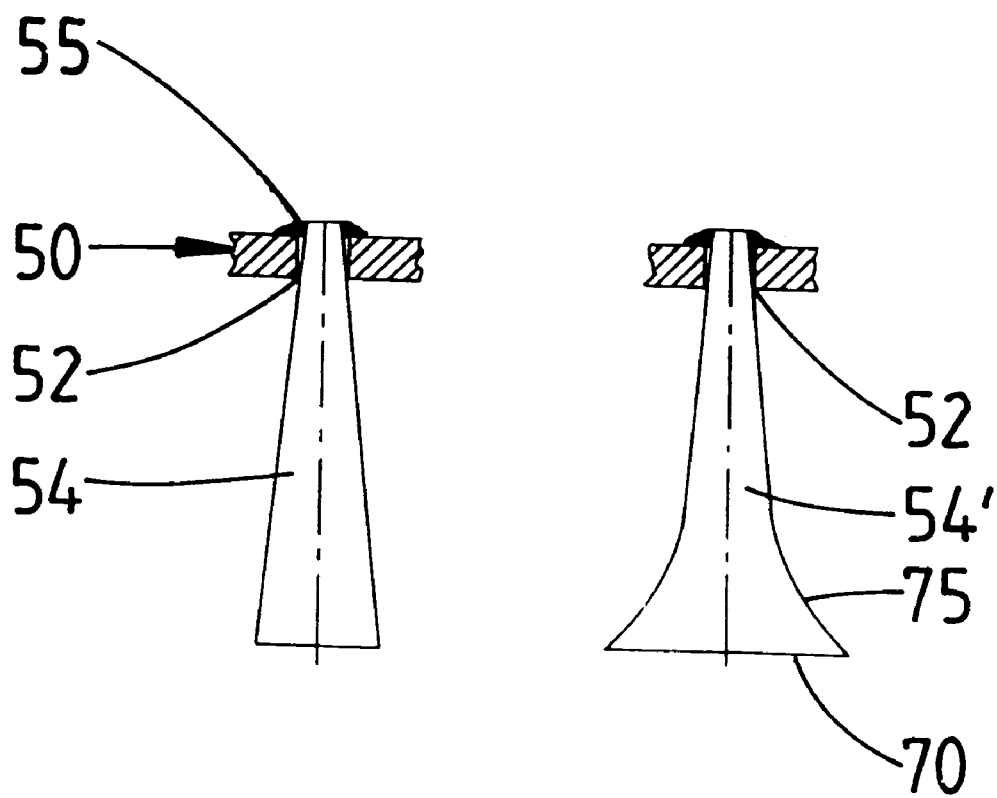
FIG. 5 is a side elevational view of alternative forms of conical nozzle suitable for the distributor plate in the assembly of FIG. 2.

Completing the definition of the plenum chamber is a distributor plate 50 which in situ would typically be arranged generally horizontally. Distributor plate 50 is supported from housing base portion 43 by multiple pillars 51 arranged in respective inner and outer rings within plenum chamber 48. Plate 50 has an array of multiple openings 52 each fitted with an elongated nozzle 54 (FIG. 5) in the form of an upwardly convergent cone. Reducing gas exits chamber 48 through nozzles 54 for forming a fluidised bed above the distributor plate in the main chamber of the respective reactor. For convenience, FIG. 2 shows only two nozzles but it will be understood that a large number will be distributed across plate 50. Each nozzle is secured by welding a washer 55 about the upper, narrower end of the nozzle and to the top surface distributor plate 50. With reference to FIG. 4, each nozzle cone 54 may, as in present designs, be a cone with a straight side wall. Alternatively, as seen at the right in FIG. 5, the peripheral wall 75 of the cone may flare downwardly and outwardly, to a wide mouth 70 at the lower end. This design of cone assists in reducing flow separation at and about the cone and thereby further assists in reducing accretions.

Figure 3:
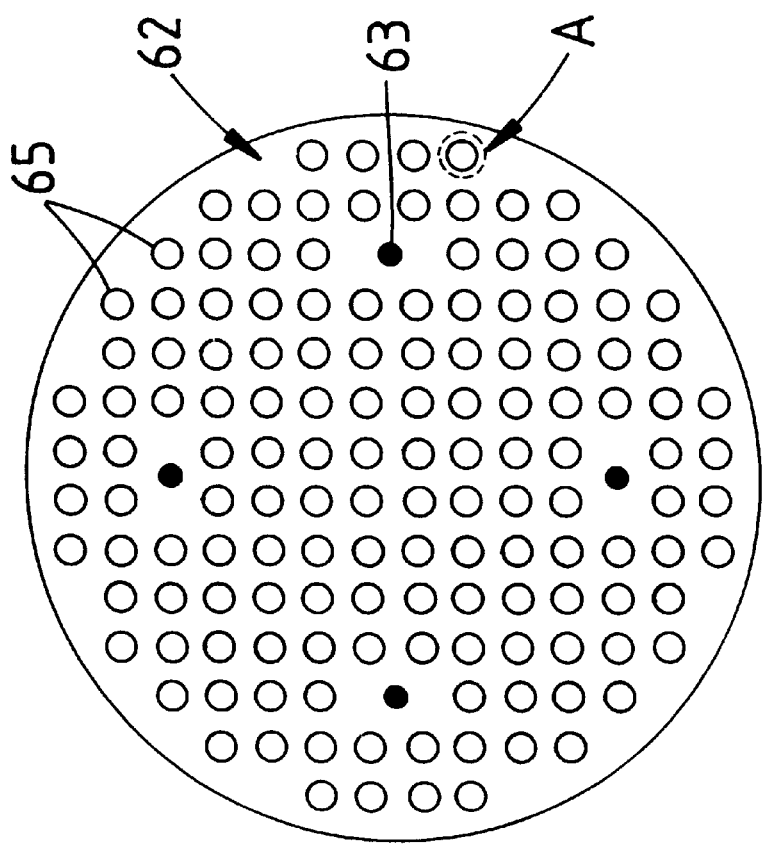
FIG. 3 is a plan view of the baffle plate of the assembly illustrated in FIG. 2.

Disposed generally centrally and midway between gas inlet 45 and distributor plate 50 is baffle means 60 for spreading the gas flow from inlet 45 among the nozzles 54. In accordance with an embodiment of the invention, baffle means 60 comprises a single circular baffle plate 62 positioned coaxially with cylindrical side wall 42, distributor plate 50 and gas inlet 45. Baffle plate 62 is suspended from distributor plate 60 by four posts 63, and is of a diameter to fit within the inner ring of pillars 51. Plate 62 has a square array of circular apertures 65 (FIG. 3). By square array in this context is not meant that the array is a square but rather that the centres of the apertures 65 are arranged on a square grid. It will of course be understood that other arrays and other aperture shapes are possible within the ambit of the invention, but the apertures are preferably sized and arranged so that the porosity of the plate is in the preferred range 0.1 to 0.6, more preferably in the range 0.15 to 0.30, most preferably about 0.2. A satisfactory size for apertures 65 is circular of about 40 to 60 mm diameter, but the principal objective in that the aperture be large enough to accommodate dustladen flow without blockage.

This latter requirement is satisfied, for example, where apertures 65 are arranged on a square pitch ε given by:

$$\varepsilon = \frac{\pi}{4}\left(\frac{d}{P}\right)^2$$

where d is the diameter of apertures 65 and P the centre-to-centre square unit spacing of the apertures in the array, as indicated in FIG. 3.

The diameter of plate 62 is intermediate the diameters of gas inlet 45 and distributor plate 50. In general, the diameter of plate 62 may conveniently be between 0.3 and 0.4 of the internal diameter of cylindrical side wall portion 42, and therefore typically also of distributor plate 50, or about 1.2 to 1.8, preferably about 1.5, times that of gas inlet 45.

Figure 7:
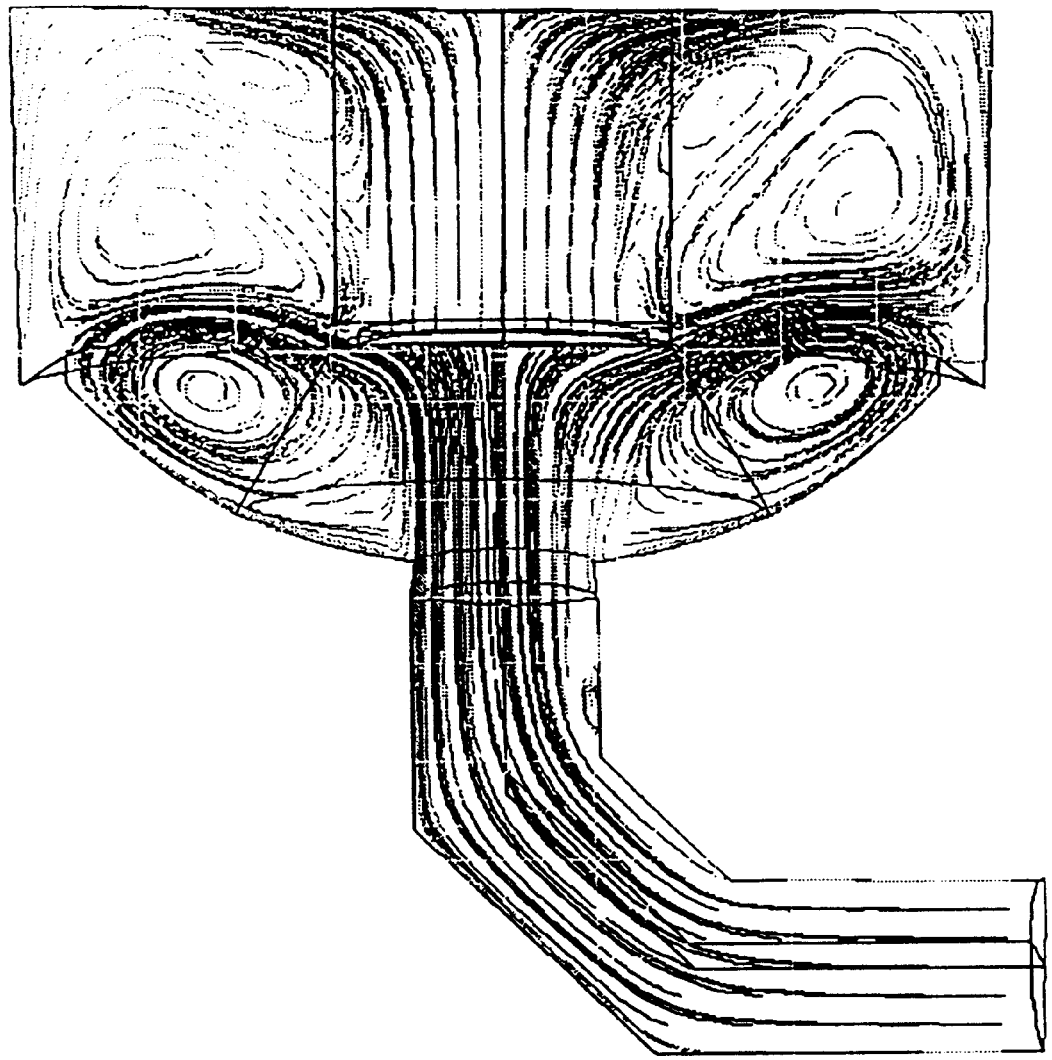
FIGS. 7, 8 and 9 are computed streakline plots of the flow fields along the axis of symmetry, respectively for the assemblies of FIGS. 2 and 6, and for a conventional gas inlet plenum assembly in a reactor for the FIOR process.
Figure 8:
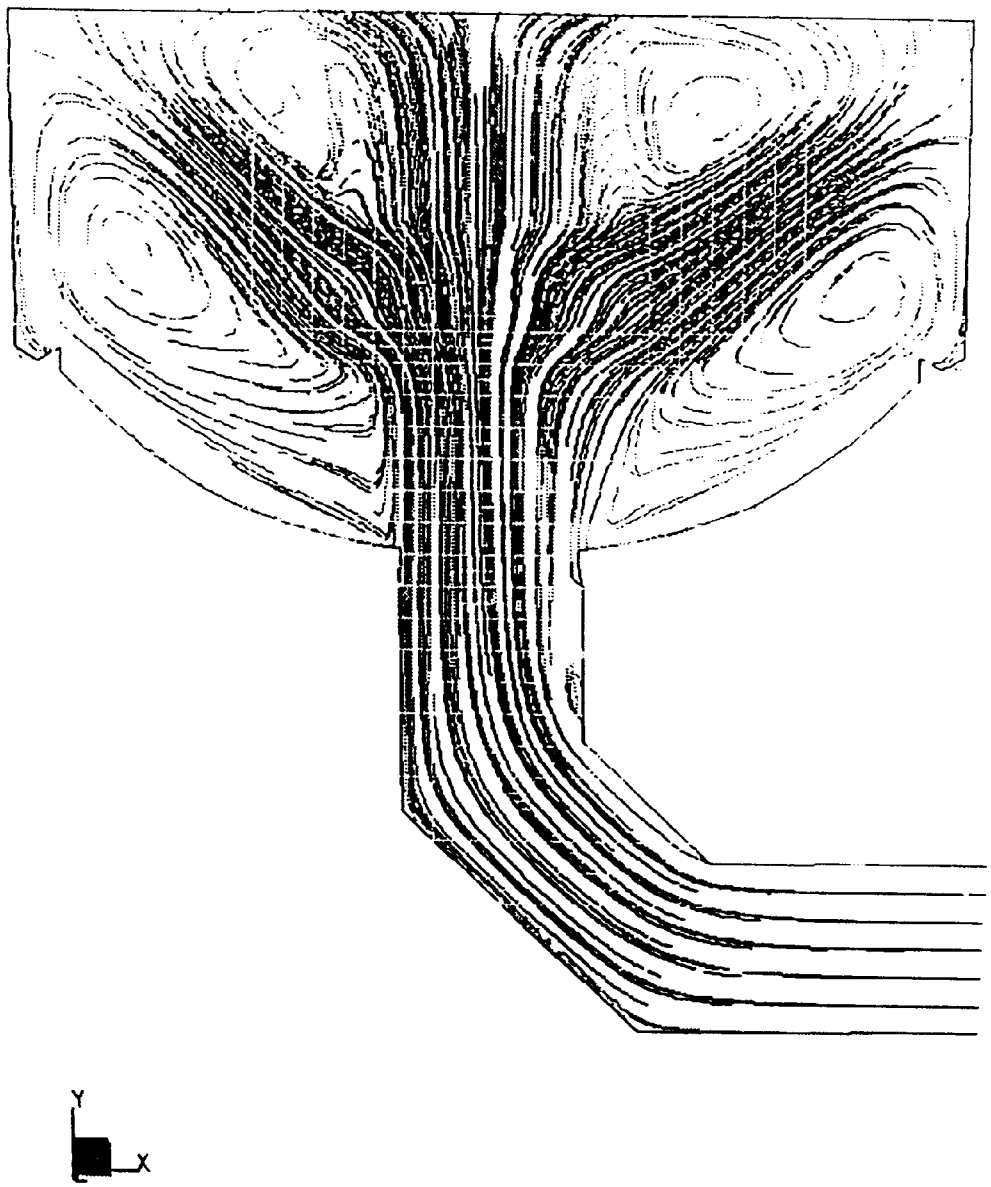
Figure 9:
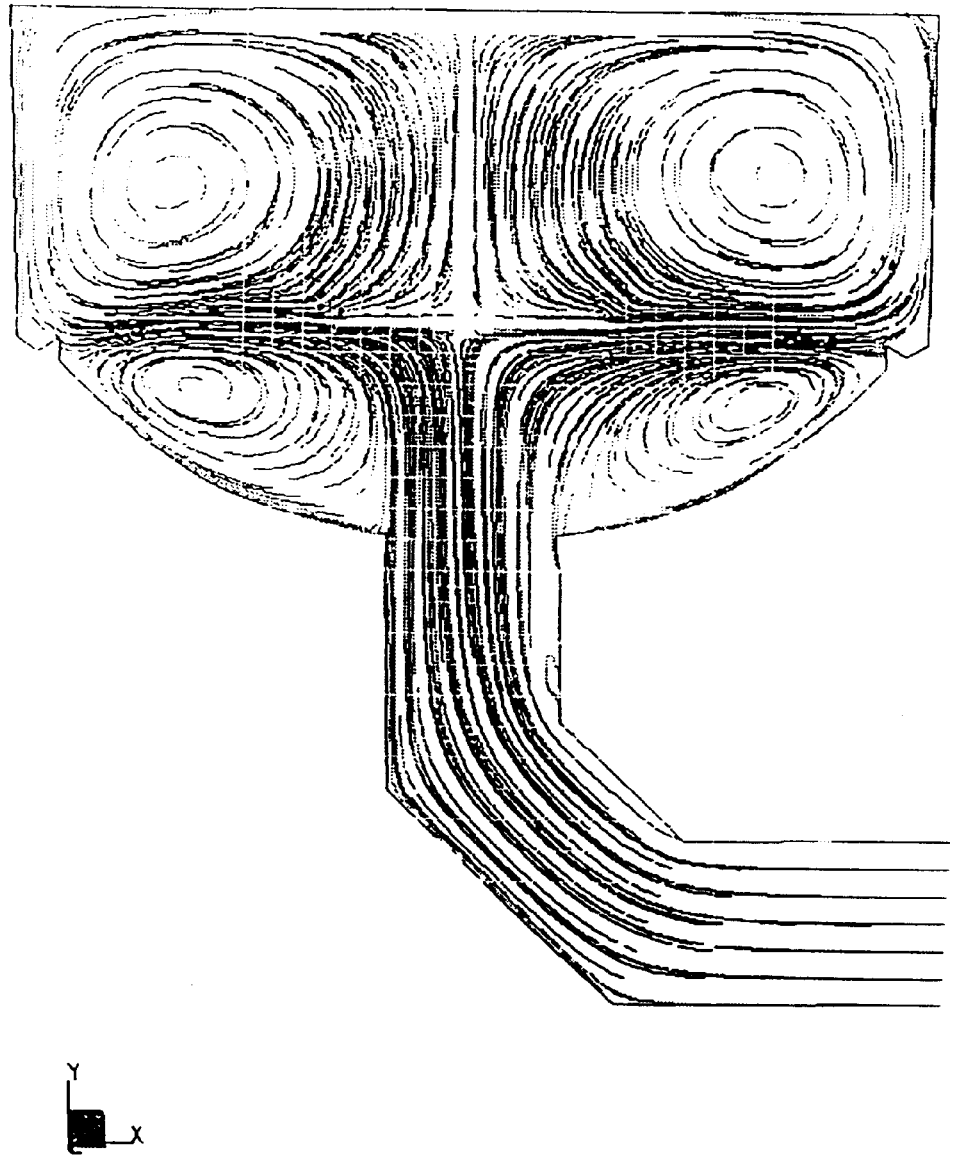

FIG. 7 is a calculated streakline plot of the flow field created along the reactor centre line of the embodiment of FIG. 2 by admission of a gas flow at inlet 45, for a plate porosity of optimum value 0.2. A streakline is defined as the path a massless particle would take if it entered the flow field at the start point of the streakline. For purposes of comparison, FIG. 9 is a corresponding streakline plot for a plenum assembly of similar construction except for substitution of the baffle arrangement 60 by a conventional single impervious plate at approximately the position of the baffle plate 62 as viewed in FIG. 2. It will be seen that, with FIG. 9, there is a very substantial transverse flow in the region of the distributor plate, whereas the transverse component of flow is relatively much reduced in the plot of FIG. 7. In general, there is much less crossflow in the plenum chamber with the baffle configuration of FIG. 2. Video records of actual flow patterns, using smoke-laden air and a laser-exposure arrangement, have demonstrated that the calculated plots of FIGS. 7, 8 and 9 are generally reflected in practice. It has been found that substantial reduction in cross flow is effective in reducing the rate of accretion build up on the cones and thereby extending campaign length. Appreciation of the desirability of reducing crossflow is an aspect of the understanding involved in the present invention. It is thought that an accretion will tend to form most rapidly where a dust-laden high velocity stream impinges on a solid surface, and also where flow separation results in recirculation eddies at the cone entrance. Observation of accretion formation on cones in the conventional practice of the FIOR DRI process have suggested this understanding.

The reduction in cross-flow velocity is further demonstrated in FIG. 10, which depicts a plot B of calculated cross-flow velocity at a uniform distance below distributor plate 54 for the baffle arrangement of FIG. 2. For comparison, the corresponding plot for FIG. 9 is included at A. It will be seen that the peak cross-flow velocity is more than halved.

Figure 6:
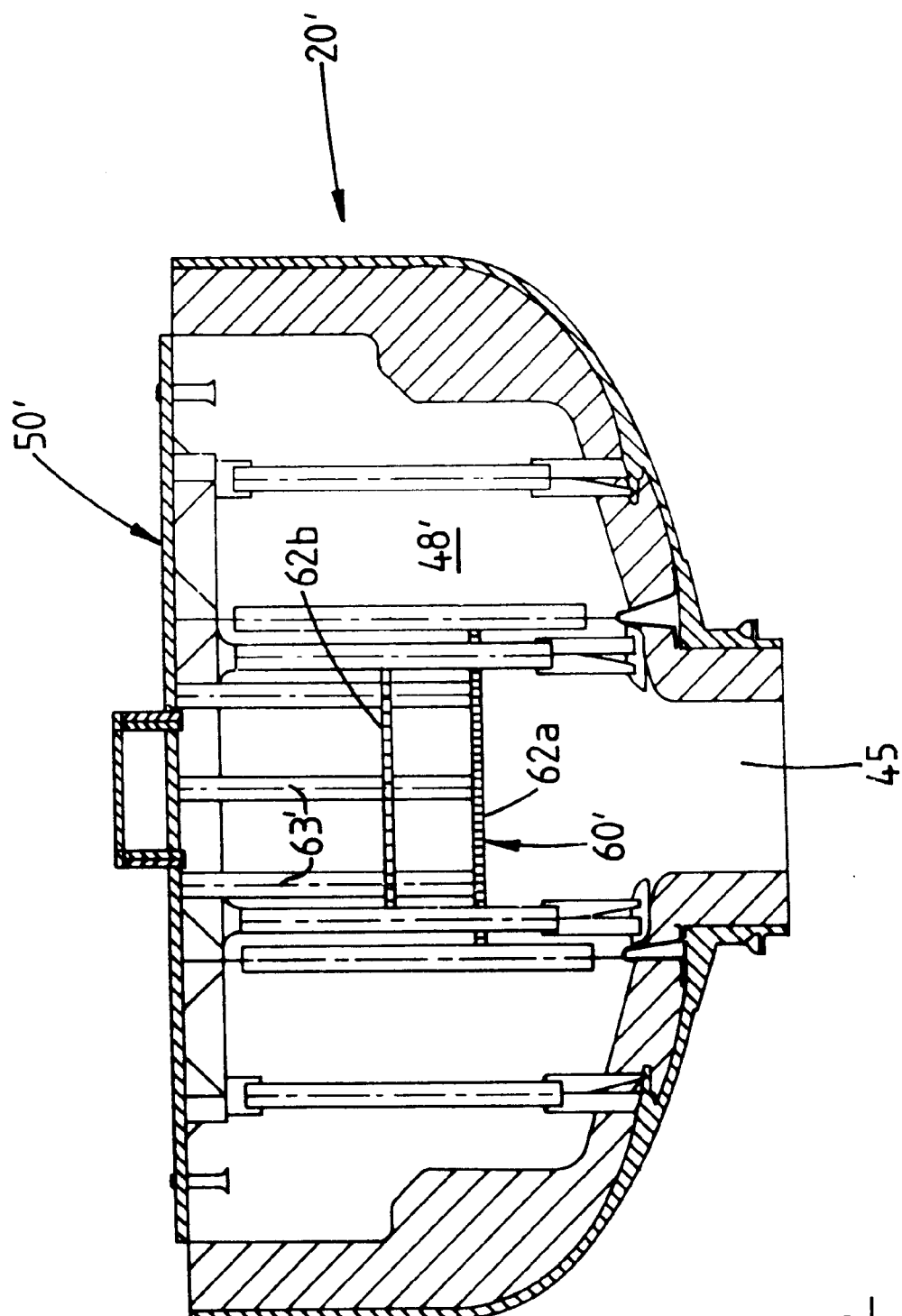
FIG. 6 is a view similar to FIG. 2 of a second embodiment of gas inlet plenum assembly having a pair of baffle plates.
Figure 10:
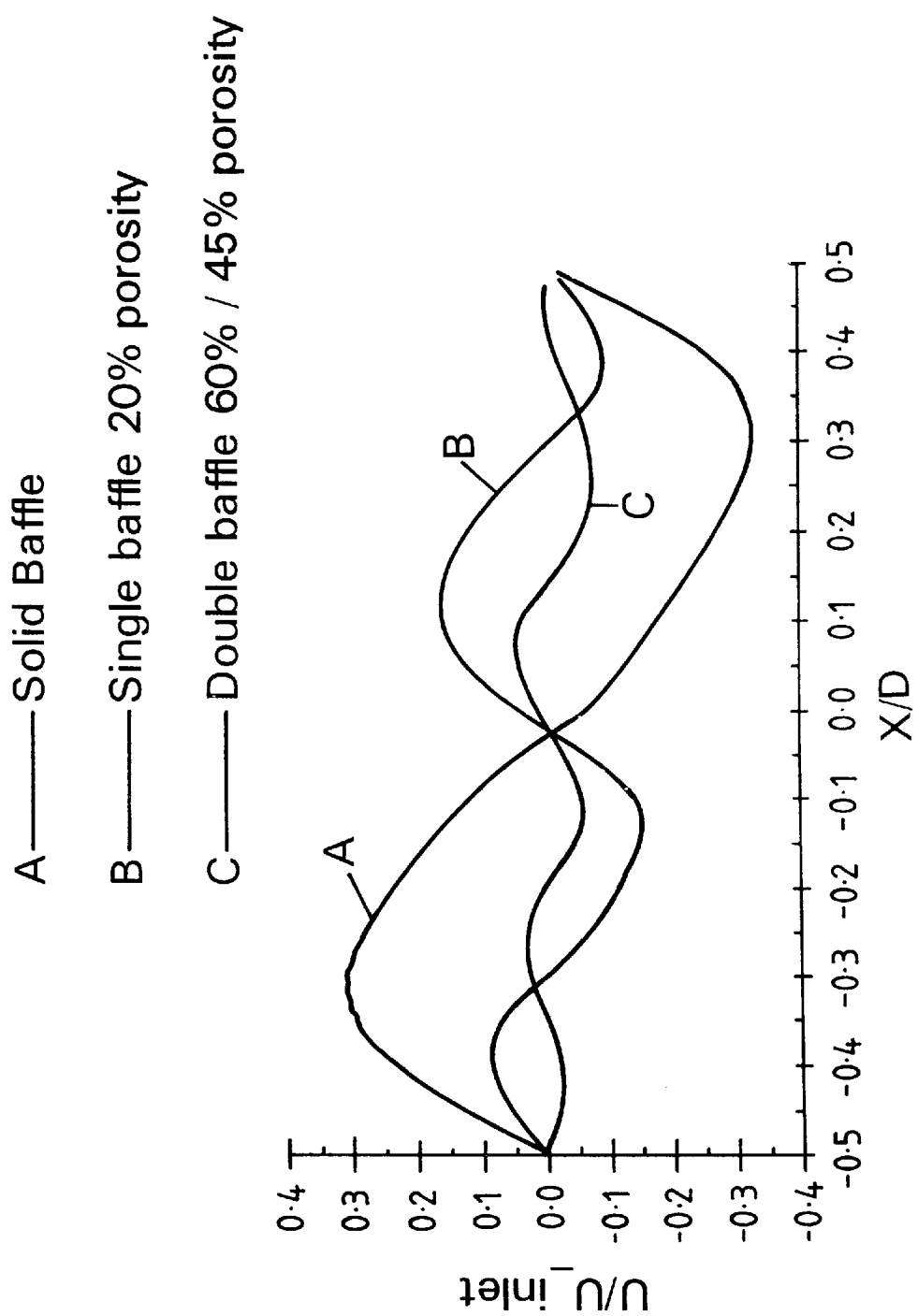
FIG. 10 is a graph that depicts calculated transverse gas velocities as a function of distributor plate radius, at uniform positions 150 mm below the distributor plate, for the embodiments of FIGS. 2 and 5, and for a conventional assembly.

A dual baffle plate embodiment is illustrated in FIG. 6, the matching streakline plot in FIG. 8, and the corresponding cross-flow velocity plot at C in FIG. 10. The latter two diagrams are for porosities of 0.6 for the lower plate 62a, and 0.45 for upper plate 62b. It has been found that even better performance is achieved with the dual plate arrangement, though the porosities of each is preferably substantially greater that for the single plate 62. The above indicated porosities gave optimum performance, but only marginally better than where both were 0.45 or 0.6. In general, in the dual plate case, the porosities should preferably be in the range 0.3 to 0.7, and higher for the lower plate than the upper plate.

The preferred separation of plates 62a, 62b is a matter of experiment in an individual context. The optimum separation is likely to increase with increasing plate diameter. A separation x of about 500 mm has been found satisfactory for plates of diameter D=1.3 m: a preferred ratio x/D is around ⅛ to ¾.

FIGS. 7 to 9 reveal the manner in which the perforated baffle plate(s) modifies the gas flow. With the conventional unperforated plate (FIG. 9), a single vortex is formed, giving a strong unidirectional radially inward flow across the underside of the distributor plate 50. With both embodiments of the invention, multiple vortices generate opposing radially inward and outward flows at the plate 50. It is believed that this counterflow pattern may directly contribute to the reduction in cross-flow velocity at the nozzle mouths.

What is claimed is:

1. A gas plenum assembly for a fluidized bed apparatus, comprising:

a structure defining one or more side and base walls of a plenum chamber;

means defining an inlet for gas to enter said chamber, arranged so that said gas flows upwardly into said chamber from said inlet;

distributor means overlying said chamber and having multiple openings through which said gas exits said chamber for forming a fluidized bed above said distributor means; and gas flow spreader means disposed between said inlet and said distributor means for spreading said gas flow among said openings, said gas flow spreader means having a plurality of flow apertures for said gas flow therethrough, and wherein said gas flow spreader means and said flow apertures are sized and arranged to substantially reduce cross-flow velocity of said gas at said openings.

2. A gas plenum assembly according to claim 1 wherein said gas flow spreader means includes one or more perforated baffle plates.

3. A gas plenum assembly according to claim 2 wherein there is one said perforated baffle plate having a porosity of between 0.1 and 0.6.

4. A gas plenum assembly according to claim 3 wherein said porosity is about 0.2.

5. A gas plenum assembly according to claim 2 wherein there are two of said baffle plates.

6. A gas plenum assembly according to claim 5 wherein said baffle plates each have a porosity in the range 0.3 to 0.7.

7. A gas plenum assembly according to claim 5 or 6 wherein the spacing between the plates is no greater than about ¾ of the baffle plate diameter.

8. A gas plenum assembly according to claim 1, wherein said gas flow spreader means causes opposing flows at said openings from said chamber.

9. A gas plenum assembly according to claim 1, wherein said gas inlet plenum assembly is substantially axially symmetrical about a central vertical axis.

10. A gas plenum assembly according to claim 1, wherein said distributor means includes a distributor plate and the openings therein include nozzle that are upwardly convergent cones.

11. A gas plenum assembly according to claim 1, wherein said gas flow spreader means extends parallel to a distributor plate and midway between said distributor plate and said gas inlet.

12. A gas plenum assembly according to claim 1, wherein said gas plenum assembly is mounted in a fluidized bed reactor for providing a fluidized bed support in said reactor.

13. A fluidized bed reactor for reducing particulate iron oxide, said fluidized bed reactor comprising:

a gas inlet plenum assembly having a structure defining one or more side
and base walls of a plenum chamber;

means defining an inlet for gas to enter said chamber, arranged so that said gas flows upwardly into said chamber from said inlet;

distributor means overlying said chamber and having multiple openings defined by upwardly convergent nozzles through which said gas exits said chamber for forming a fluidized bed above said distributor means; and gas flow spreader means disposed between said inlet and said distributor means for spreading said gas flow among said openings, said gas flow spreader means comprising means in said gas inlet plenum assembly arranged to substantially reduce gas crossflow velocity at said nozzle and thereby minimize the rate of formation of accretions on or adjacent to said nozzles which diminish flow from said plenum chamber.

14. The fluidized bed reactor according to claim 13, wherein said gas flow spreader means includes one or more perforated baffle plates.

15. The fluidized bed reactor according to claim 13 or 14, wherein said gas flow spreader means causes opposing flows at said openings from said chamber.

16. A gas plenum assembly according to claim 2, wherein said gas flow spreader means causes opposing flows at said openings from said chamber.

17. A gas plenum assembly according to claim 2, wherein said distributor means includes a distributor plate and said openings therein include nozzles that are upwardly convergent cones.

18. A gas plenum assembly according to claim 2, wherein said gas flow spreader means extends parallel to a distributor plate and midway between said distributor plate and said gas inlet.

19. A gas plenum assembly according to any one of claims 16 to 18, wherein there are two baffle plates.

* * * * *

UNITED STATES PATENT AND TRADEMARK OFFICE
CERTIFICATE OF CORRECTION

PATENT NO. : 6,299,826 B1
DATED : October 9, 2001
INVENTOR(S) : Brent et al.

It is certified that error appears in the above-identified patent and that said Letters Patent is hereby corrected as shown below:

Title page,
Item [57] ABSTRACT, line 1, "fluidised" should read -- fluidized --

Column 6,
Line 57, "nozzle" should read -- nozzles --

Column 7,
Line 3, "¶and" should read -- and --
Line 16, "crossflow" should read -- cross-flow --
Line 17, "nozzle" should read -- nozzles --

Signed and Sealed this

Twenty-first Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,299,826 B1
DATED : October 9, 2001
INVENTOR(S) : Brent et al.

It is certified that error appears in the above-identified patent and that said Letters Patent is hereby corrected as shown below:

<u>Title page,</u>
Item [57], ABSTRACT,
Line 1, "fluidised" should read -- fluidized --

<u>Column 6,</u>
Line 57, "nozzle" should read -- nozzles --

<u>Column 7,</u>
Line 3, "¶and" should read -- and --
Line 16, "crossflow" should read -- cross-flow --
Line 17, "nozzle" should read -- nozzles --

Signed and Sealed this

Twentieth Day of July, 2004

JON W. DUDAS
*Acting Director of the United States Patent and Trademark Office*